United States Patent
Binod et al.

(10) Patent No.: US 10,690,569 B2
(45) Date of Patent: Jun. 23, 2020

(54) DEVICE FOR COLLECTING WATER SAMPLE TO CONCENTRATE DIVERSIFIED BACTERIA FROM DIFFERENT WATER DEPTH

(71) Applicant: Council of Scientific & Industrial Research, New Delhi (IN)

(72) Inventors: Sweta Kumar Binod, Gujarat (IN); Soumya Haldar, Gujarat (IN); Amit Bhattacharya, Gujarat (IN); Paramita Manna, Gujarat (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 16/335,229

(22) PCT Filed: Sep. 29, 2017

(86) PCT No.: PCT/IN2017/050440
§ 371 (c)(1),
(2) Date: Mar. 20, 2019

(87) PCT Pub. No.: WO2018/061035
PCT Pub. Date: Apr. 5, 2018

(65) Prior Publication Data
US 2019/0250074 A1     Aug. 15, 2019

(30) Foreign Application Priority Data
Sep. 30, 2016     (IN) .............................. 201611033417

(51) Int. Cl.
*G01N 1/12*     (2006.01)
*G01N 1/40*     (2006.01)
(Continued)

(52) U.S. Cl.
CPC .............. *G01N 1/12* (2013.01); *G01N 1/10* (2013.01); *G01N 1/20* (2013.01); *G01N 1/40* (2013.01)

(58) Field of Classification Search
CPC .............. G01N 1/10; G01N 1/12; G01N 1/14
See application file for complete search history.

(56) References Cited

U.S. PATENT DOCUMENTS

| | | | | |
|---|---|---|---|---|
| 4,949,582 A | * | 8/1990 | Vollweiler | ............ E21B 49/082 |
| | | | | 73/864.63 |
| 6,887,432 B2 | * | 5/2005 | Kansy | ................. B01L 3/50255 |
| | | | | 422/544 |

(Continued)

FOREIGN PATENT DOCUMENTS

| CN | 101864386 A | 10/2010 |
|---|---|---|
| CN | 102175632 A | 9/2011 |
| JP | 2016-147713 A | 8/2016 |

*Primary Examiner* — Justin N Olamit
(74) *Attorney, Agent, or Firm* — Knobbe, Martens, Olson & Bear, LLP

(57) ABSTRACT

A water sampling device has a rigid body, a top lid, extension members, a horizontal member, a spring, a rod, at least one polymer membrane and a bottom lid. The top lid has a shaft attached to it and the shaft traverses through the horizontal member. The bottom lid is connected to the rod upon which the at least one polymer membrane is attached perpendicularly. The water sampling device undergoes two different stages of lid opening and closing while in operation of collecting water sample to concentrate diversified bacteria from different water depths. The top lid, the shaft and the spring co-operate with the rigid body and the horizontal member such that in a first state, the top lid seals the top end opening while in a second state allows fluid to flow to an inside portion of the rigid body.

12 Claims, 3 Drawing Sheets

(51) Int. Cl.
*G01N 1/20* (2006.01)
*G01N 1/10* (2006.01)

(56) References Cited

U.S. PATENT DOCUMENTS

| | | | |
|---|---|---|---|
| 8,431,089 B2 * | 4/2013 | Steigmiller | C12M 33/04 |
| | | | 422/502 |
| 10,300,437 B2 * | 5/2019 | Doyen | B01D 63/081 |
| 2013/0145867 A1 | 6/2013 | Michelin | |
| 2015/0251116 A1 * | 9/2015 | Baer | B29C 48/05 |
| | | | 210/488 |

* cited by examiner

DEVICE FOR COLLECTING WATER SAMPLE TO CONCENTRATE DIVERSIFIED BACTERIA FROM DIFFERENT WATER DEPTH

FIELD OF INVENTION

The present invention relates to a device which is used for the water sample collection from different water depth. The device concentrates the diversified bacteria in a membrane surface. The membrane used for this device is a hydrophobic in nature and made up of polyvinylidene fluoride (PVDF) polymer (20% w/w) with the property of enhanced bacterial attachment.

BACKGROUND OF THE INVENTION

Marine environment is rich in microbial resources, which can provide range of novel bioactive compounds like enzymes, secondary metabolites etc. It has also remarkable bioremediation capabilities. Study of marine bacteria is important as they play a crucial role in decomposition of organic matter and cycling of nutrients. But our knowledge of marine bacterial diversity is critically limited. In addition to that, pollution monitoring of seawater with respect to bacterial diversity is very important to understand its quality. It is a challenging task to isolate maximum types of bacteria from these water samples as bacterial concentration in the seawater as well as other sources are very low. In addition to that depth wise bacterial diversity study of marine water is very important. In general, the depth-related gradient of physical and chemical properties provides niches for a wide variety of metabolically diverse microorganisms in marine water. Bacterial distribution in the marine water is not uniform throughout different water depths. Factors affecting this distribution are carbon, nitrogen, phosphorous limitations, temperature, light, pressure and salinity etc. At air-water interface of seawater, bacterial concentration is more and it decreases as depth increases. Hence, there bacterial diversity profiling of different seawater depth is important.

In general filtration is a common method to concentrate the bacteria before plating. However, during filtration process, small size bacteria can escape through the filter and also the barophobic bacteria might get damaged during this process. Therefore majority of the time when diversity study is performed with filtration method, many species do not appear in the result. Further, water sample generally collect for bacterial diversity study comprises small volume which might not represent all the types of bacteria. Various materials viz. ceramic, polymers are used for the preparation of these membranes. However, the simplicity in preparation in cost effective manner using particular type of membrane is very difficult. There are many kinds of bacteria which have been recovered from different membranes.

Reference may be made to a patent CN101864386A, wherein it describes a method for enriching seawater bacteria by asepsis cellulose filter membrane. This enrichment method uses sterilized syringe and a syringe needle type filter. The asepsis cellulose filter membrane is put in a sterilized filer and seawater is filled into the filter by the syringe and enriching seawater bacteria. The cellulose filter membrane enriched with seawater bacteria is kept on a culture medium and cultivated subsequently. In this patent external efforts are needed to collect the bacteria.

Reference may be made to a patent CN102175632A, wherein it describes a bacterial detection method, which comprises a sampling method in which the test sample is passed through a hollow fiber filtration unit for trapping bacteria and/or bacterial metabolites in hollow fiber membranes which get accumulated in the filter unit. Again the sampling method is filtration based. Using this method, certain types bacteria may be missed which cannot withstand applied pressure or can pass through the pore of the membrane.

Reference may be made to an existing techniques which is used to collect samples of seawater involve immersing an open ended tube, like a Niskin bottle, to the required depth and then manually triggering spring-loaded caps at both ends of the tube, to close the tube and capture the sample. The tube is typically let down into the sea at the end of a line and, when the required depth is reached, a weight (messenger) is dropped down the line to trigger closure. The closed tube can then be drawn back and the seawater sample transferred to a flask for analysis. The open end of the glass tube is not sealed; therefore there is a chance of both water and atmospheric contamination. In addition to that, containers used for that purpose is of massive size to withstand pressure differential between an evacuated container and the ambient water pressure which are needed for great depths. Sterilization of the containers is very difficult.

It is therefore an object of the present invention to provide improved underwater sampling device and methods.

SUMMARY

This summary is provided to introduce a selection of concepts in a simplified format that are further described in the detailed description of the invention. This summary is not intended to identify key or essential inventive concepts of the claimed subject matter, nor is it intended for determining the scope of the claimed subject matter.

According to one embodiment, the present invention provides a water sampling device comprises: a rigid body with a bottom end opening and a top end opening, extension members extending above the top end opening and a horizontal member connected between the extension members so as to be located in a spaced-apart relationship with the top end opening; a top lid located between the top end opening and the horizontal member; a shaft defining a first end and a second end, the first end of the shaft being connected to the top lid and the second end of the shaft adapted to receive a cable member for operating the shaft, the shaft traversing through the horizontal member; a spring located around the shaft and in a space defined between the horizontal member and the top lid; the top lid, the shaft and the spring co-operating with the rigid body and the horizontal member such that in a first state, the top lid seals the top end opening while in a second state allows fluid to flow to an inside portion of the rigid body; a bottom lid co-operating with the rigid body to seal the bottom end opening in a first state and the bottom lid being separated from the rigid body and not sealing the bottom end opening in a second state; a rod member connected to the bottom lid, the rod member being adapted to traverse through the inside portion of the rigid body when the bottom lid is in the first state; and at least one polymer membrane is attached perpendicularly to the rod.

In an embodiment of the present invention, a water sampling device is provided. The water sampling device collects water from desired seawater depth. The device has pulling lid connected with a spring attached with a rope. For sampling the device is immersed into seawater till the selected depth with the help of another rope tied to the hooks attached on the cylinder. The lid is then pulled with the help of rope which allows water to fill inside the cylindrical sampling container. The membrane fitted inside the container then comes into the contact of seawater of the selected depth. The rope attached to the lid is then released to close the filled sampling container and pulled upwards with the help of rope tied to the cylinder.

In another embodiment of the present invention, a method for sampling with polymeric membrane to study bacterial diversity is provided. The method includes selecting a cost effective membrane having enhanced bacterial affinity among commonly used membranes. The membrane was further incorporated into an instrument cum water sampler to concentrate bacteria from desired water depth.

In another embodiment of the present invention, the membrane was used at field for real time application to concentrate bacteria from seawater at chosen depth. The membrane attached diversified bacteria from the seawater at real time rather the sample brought to the laboratory which might destroy some bacteria during transportation.

In yet another embodiment of the present invention, the sampler used has simple mechanism of opening and closing of water inlet. It further avoids the contamination of bacteria from different water depths of seawater. It also circumvents the use of messenger used in majority types of water sampling devices.

BRIEF DESCRIPTION OF THE DRAWINGS

To further clarify the advantages and aspects of the invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings thereof.

It may be noted that to the extent possible, like reference numerals have been used to represent like elements in the drawings. Further, those of ordinary skill in the art will appreciate that elements in the drawings are illustrated for simplicity and may not have been necessarily drawn to scale.

DETAILED DESCRIPTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Figure 1:
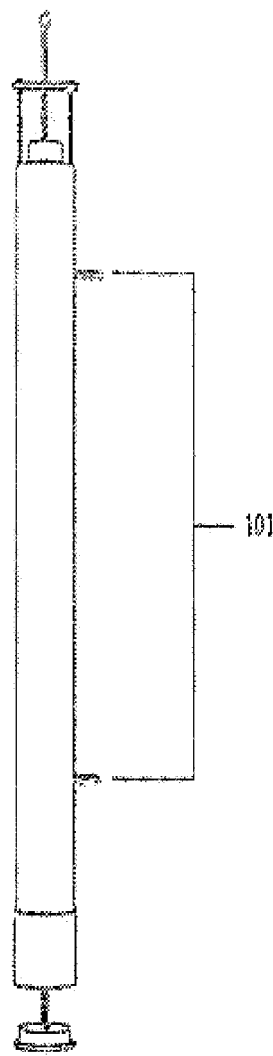
FIG. 1 is a perspective view of the water sampling device of the present invention.

FIG. 1 depicts the perspective view of the present invention. FIG. 1 shows a water sampling device 100 comprising two hooks 101 at top portion and bottom portion.

Figure 2:
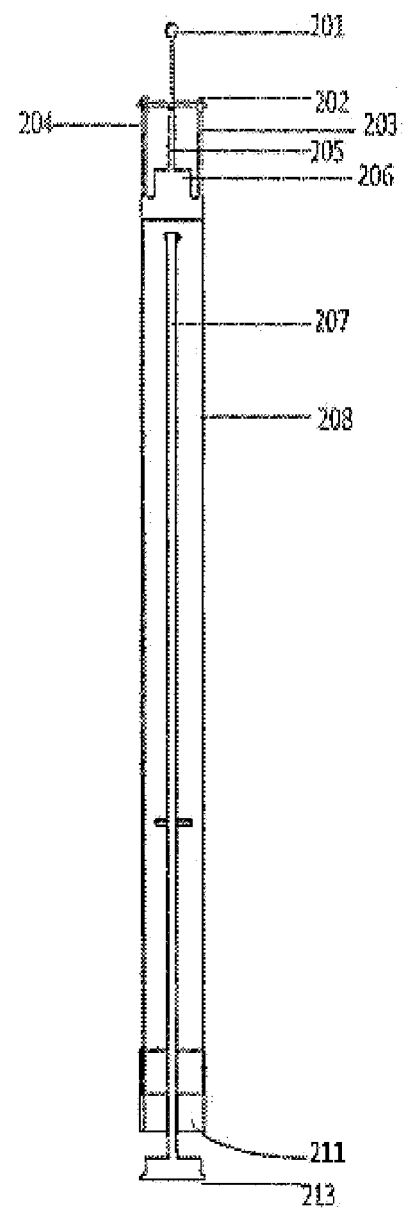
FIG. 2 shows opened part of the rod from the base of the water sampler.

FIG. 2 is the schematic representation of water sampling device 200 comprises: a rigid body 208 with a bottom end opening and a top end opening, extension members 203,204 extending above the top end opening and a horizontal member 202 connected between the extension members 203,204 so as to be located in a spaced-apart relationship with the top end opening; a top lid 206 located between the top end opening and the horizontal member 202; a shaft 201 defining a first end and a second end, the first end of the shaft being connected to the top lid 206 and the second end of the shaft adapted to receive a cable member for operating the shaft, the shaft traversing through the horizontal member 202; a spring 205 located around the shaft 201 and in a space defined between the horizontal member and the top lid; the top lid 206, the shaft 201 and the spring 205 co-operating with the rigid body 208 and the horizontal member 202 such that in a first state, the top lid 206 seals the top end opening while in a second state allows fluid to flow to an inside portion of the rigid body 208; a bottom lid 213 co-operating with the rigid body 208 and a ring 211 to seal the bottom end opening in a first state and the bottom lid 213 being separated from the rigid body 208 and not sealing the bottom end opening in a second state; a rod member 207 connected to the bottom lid 213, the rod member 207 being adapted to traverse through the inside portion of the rigid body 208 when the bottom lid 213 is in the first state; and at least one polymer membrane 210 is attached perpendicularly to the rod 207.

Figure 3:
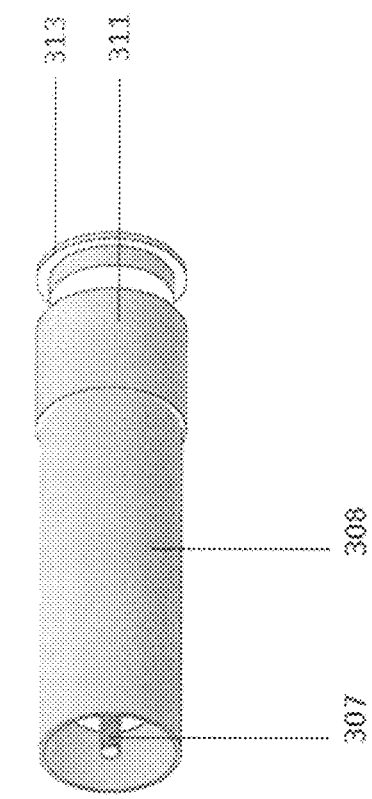
FIG. 3 shows the cross-sectional view of the water sampler.

FIG. 3 depicts cross-sectional view of a water sampling device. FIG. 3 shows a rod 307, a rigid body 308, a bottom lid 313 and lower part of the water sampling device fitted with a ring 311. The body of the rigid body 308 is not limited to iron, steel, any metal, polymer or alloy, having a diameter range between 80 to 100 mm and length of the cylinder is in the range of 830 to 850 mm.

Figure 4:
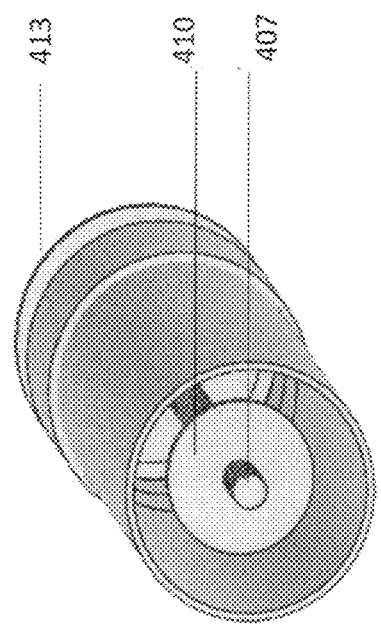
FIG. 4 again shows the cross-sectional view of water sampler with the membrane fitted inside the sampler.

FIG. 4 depicts another cross-sectional view of a sampling device. FIG. 4 shows a polymeric membrane 410 fitted with a rod 407. The polymer membrane 410 is made of polyvinylidene fluoride (PVDF) and can be varied in size and shape, based on the requirement. The rod 407 member connected to the bottom lid 413 is threaded to fit with the at least one polymeric membrane 410 perpendicularly with nuts. Further, the size of the polymer membrane 410 should be less than the inner diameter of the rigid body for free water movement inside the rigid body. The polymer membrane 410 concentration can be varied within the range of 12-24% w/w and the thickness of the polymeric membrane 410 is at least between 30-35 μm and can be extended up to 50 μm. Further the polymeric membrane 410 is kept on the polyester fabric of thickness to support the at least one polymeric membrane.

Figure 5:
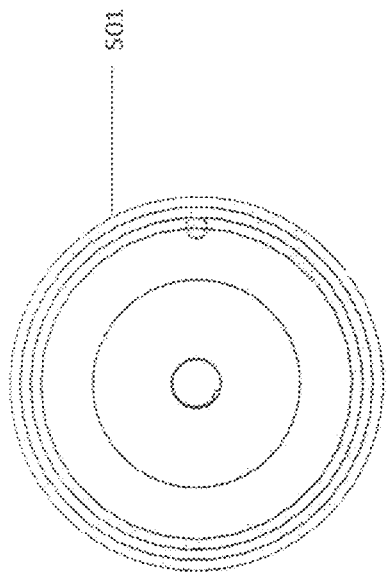
FIG. 5 is the bottom view of the sampler.

FIG. 5 is the bottom view 501 of a water sampling device.

Figure 6:
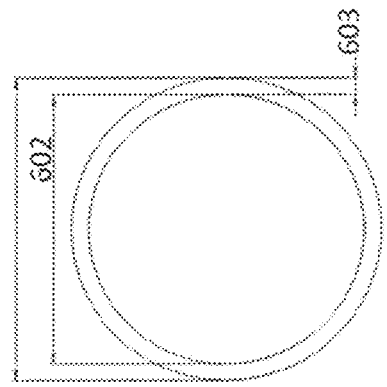
FIG. 6 shows the internal and external diameter of cylindrical water sampler.

FIG. 6 shows an external diameter 601, an internal diameter 602 and a diameter difference 603 between the external diameter 601 and internal diameter 602 of cylindrical body of the water sampling device. The body of the rigid body 308 is not limited to iron, steel, any metal, polymer or alloy, having a diameter range between 80 to 100 mm and the thickness of the rigid body is in the range of 5-6 mm.

Figure 7:
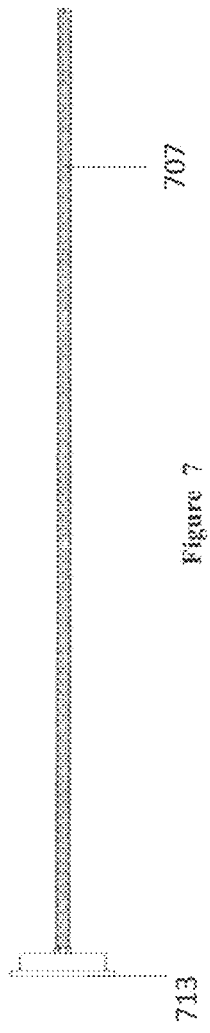
FIG. 7 is opened internal part of water sampler which is a rod attached with the base of the water sampler for fitting membranes.

FIG. 7 is opened internal part of a water sampling device which is a rod 707 attached with a bottom lid 713 of a water sampler for fitting membranes (not shown here).

Figure 8:
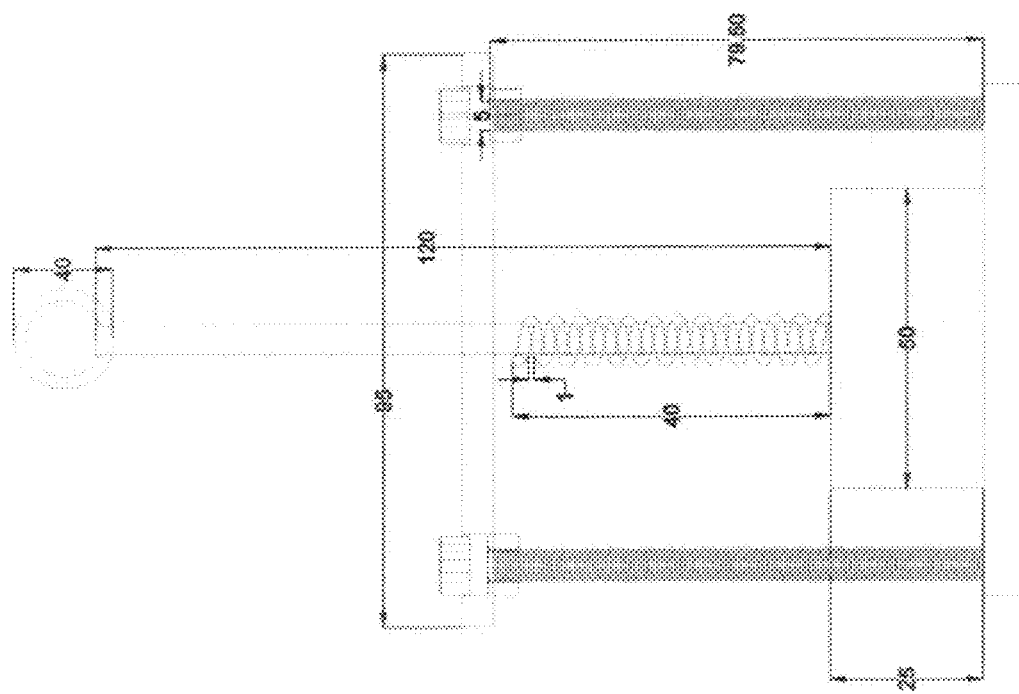
FIG. 8 depicts the dimensions of upper part of the sampler from where the sampler gets opened.

FIG. 8 depicts the dimensions of upper part of a water sampling device. FIG. 8 shows the dimension of the upper part of the water sampling device.

The main objective of the present invention is to prepare a device which is used for collecting water sample to concentrate diversified bacteria from different water depth.

Another object of the present invention is to provide a process for the concentration of diversified bacteria on polymeric membrane.

Another objective of the present invention is to use PVDF (20% w/w) membrane in the device to collect and concentrate the diversified bacteria present in the water.

Another object of the present invention is to use the membrane of hydrophobic nature.

Another object of the present invention is to use the membrane having rough surface which increases the surface area and helps to get more bacterial attachment.

Another object of the present invention is to use membrane of less negatively charged which increases affinity for bacteria.

Yet another object of the present invention is to provide a cost effective water sampler device which is simple in construction and operation.

Yet another object of the present invention is to provide contamination free water sampling.

Yet another object of the present invention is to provide water sampler with simple mechanism of operation having rope attached to the spring of the lid which is operated from above the water level, which eliminates the chance of contamination by water from other layers of water as well as air.

Yet another object of the present invention is to provide water sampler for bacteriological studies without any contamination.

Yet another object of the present invention is to prepare the device with heavy iron which can withstand the water pressure at considerable depth.

Yet another object of the present invention is that it can be sterilized by autoclave.

Those skilled in the art will recognize improvements and modifications to the embodiments of the present disclosure. All such improvements and modifications are considered within the scope of the concepts disclosed herein and the claims that follow.

The invention claimed is:

1. A water sampling device comprising:
   a rigid body with a bottom end opening and a top end opening;
   extension members extending above the top end opening and a horizontal member between the extension members so as to be located in a spaced-apart relationship with the top end opening;
   a top lid located between the top end opening and the horizontal member;
   a shaft comprising a first end and a second end, the first end of the shaft being connected to the top lid and the second end of the shaft adapted to receive a cable member configured to operate the shaft, the shaft traversing through the horizontal member;
   a spring located around the shaft and in a space defined between the horizontal member and the top lid,
   wherein the top lid, the shaft and the spring co-operating with the rigid body and the horizontal member such that, in a first state, the top lid seals the top end opening while in a second state allows fluid to flow to an inside portion of the rigid body;
   a bottom lid co-operating with the rigid body to seal the bottom end opening in a first state and the bottom lid being separated from the rigid body and not sealing the bottom end opening in a second state;
   a rod connected to the bottom lid, the rod being adapted to traverse through the inside portion of the rigid body when the bottom lid is in the first state; and
   at least one polymer membrane fixed perpendicularly to the rod.

2. The water sampling device as claimed in claim 1, wherein a body of the rigid body has a diameter range between 80 to 100 mm and a length of the rigid body is in the range of 830 to 850 mm.

3. The water sampling device as claimed in the claim 1, wherein the rigid body has a weight that withstands underwater current.

4. The water sampling device as claimed in the claim 1, wherein the at least one polymer membrane is made of polyvinylidene fluoride (PVDF) and can be varied in size and shape, based on the requirement.

5. The water sampling device as claimed in the claim 1, wherein the rod connected to the bottom lid is threaded to fit the at least one polymeric membrane perpendicularly with nuts.

6. The water sampling device as claimed in the claim 1, wherein a size of the at least one polymer membrane is less than an inner diameter of the rigid body for free water movement inside the rigid body.

7. The water sampling device as claimed in the claim 1, wherein a thickness of a wall of the rigid body is in the range of 5-6 mm.

8. The water sampling device as claimed in the claim 1, wherein a concentration of the at least one polymer membrane is in a range of 12-24% w/w.

9. The water sampling device as claimed in the claim 1, wherein a thickness of the at least one polymeric membrane is at least between 30-35 μm.

10. The water sampling device as claimed in the claim 1, wherein the at least one polymeric membrane is kept on a polyester fabric of thickness to support the at least one polymeric membrane.

11. The water sampling device as claimed in the claim 1, wherein the device is made of a material that can be sterilized by an autoclave.

12. The water sampling device as claimed in claim 2, wherein the body of the rigid body comprises a material selected from the group consisting of iron, steel, a metal, a polymer and an alloy.

\* \* \* \* \*